United States Patent [19]

Whitehead

[11] Patent Number: 4,700,985
[45] Date of Patent: Oct. 20, 1987

[54] ROLL-UP COVER FOR OPEN-SIDED TRAILER

[76] Inventor: Jerald M. Whitehead, Idaho City Stage Route, Boise, Id. 83706

[21] Appl. No.: 745,230

[22] Filed: Jun. 17, 1985

[51] Int. Cl.$^4$ .............................................. B60J 5/06
[52] U.S. Cl. .................................... 296/181; 296/100; 296/98
[58] Field of Search ................. 296/100, 98, 183, 181, 296/191, 138; 160/264

[56] References Cited

U.S. PATENT DOCUMENTS

| | | | |
|---|---|---|---|
| 3,225,871 | 12/1965 | Tillinghast et al. | 296/24 R |
| 3,709,552 | 1/1973 | Broadbent | 296/183 |
| 4,037,870 | 7/1977 | O'Neal | 296/98 |
| 4,302,044 | 11/1981 | Sims | 296/100 |
| 4,529,098 | 7/1985 | Heider et al. | 296/100 |

FOREIGN PATENT DOCUMENTS

| | | | |
|---|---|---|---|
| 614997 | 2/1961 | Canada | 296/100 |
| 0050467 | 4/1982 | European Pat. Off. | 160/264 |
| 1300295 | 12/1972 | United Kingdom | 296/100 |

Primary Examiner—Robert B. Reeves
Assistant Examiner—Carol L. Olson
Attorney, Agent, or Firm—Paul F. Horton

[57] ABSTRACT

Roll-up cover apparatus for an open sided trailer box including a top rail, a flexible cover downwardly depending from the top rail, a torque tube for winding or unwinding the cover thereon, a plurality of laterally spaced straps, and one or more winches engaging the straps for placing selective tension thereon. In one embodiment the torque tube is contained below a bottom rail for placing tension on the cover itself and in a second embodiment the torque tube rest on the bottom rail with the cover defining an apron overlapping the bottom of the side opening for placement on the floor of the trailer box when hauling bulk goods and for placement over the outside of the bottom rail when hauling non-bulk goods.

16 Claims, 7 Drawing Figures

ROLL-UP COVER FOR OPEN-SIDED TRAILER

BACKGROUND OF THE INVENTION

1. Field of the Invention

This invention relates, in general, to flexible covers for trailer boxes and, more specifically to roll-up covers for open sided trailer boxes.

2. Background of the Invention

When loading non-bulk type goods, it is highly advantageous and desirable to load and unload trailer boxes from the side. This is true because of the length of the side opening, giving convenient access to the floor space, and because forklifts or other lifting devices may be used in the loading procedure. In response to this need, a number of cover assemblies for open-sided trailers have been devised as typified by U.S. Pat. Nos. 3,231,305 issued to Beckman; 3,453,020 issued to Santillo; 4,032,186 issued to Pickering et al; and 4,218,087 issued to Neville. Such devices are restricted to trailers carrying non-bulk goods and are not useable for the carrying of bulk goods such as grain, beets, potatoes, wood chips, sawdust, and the like.

SUMMARY OF THE INVENTION

The present invention solves this problem by providing covering apparatus for an open-sided trailer box whereby the trailer may carry bulk as well as non-bulk goods. The present invention comprises generally, a top rail; a flexible cover downwardly depending from the top rail for covering the opening; a plurality of horizontally spaced, vertically oriented straps depending from the top rail and engaging the flexible cover; one or more winches located below the side opening and connected to the straps to place a selective tension thereon; a torque tube for winding the cover thereon; and means for rotating the torque tube for opening or closing the cover. The cover may overlap the bottom of the open side of the trailer for resting on the trailer floor to be held in place by bulk goods and for fitting tightly over the outside of a bottom rail to prevent moisture from reaching the cargo, when carrying non-bulk goods. A more detailed description may be found in the appended claims.

It is therefore a primary object of the present invention to provide apparatus for covering an open-sided trailer box which is useable with both bulk and non-bulk goods.

It is an also an object of the present invention to provide apparatus for covering an open-sided trailer box which includes means for placing selective tension on both the cover and vertical straps engaging the cover.

More specifically, it is an object of the present invention to provide a cover for an open-sided trailer box, said cover having a plurality of vertical straps, each operable to be placed under a selected tension by a respective winch for the carrying of both bulk and non-bulk goods.

Another object of the present invention is to provide a cover for an open-sided trailer box which includes an apron which may be placed on the floor of the trailer to be held in place by bulk goods and which may be placed over the outside of a bottom rail to prevent moisture from entering the box when carrying non-bulk cargo.

Additional objects and advantages will become apparent and a more thorough and comprehensive understanding may be had from the following description taken in conjunction with accompanying drawings forming a part of the specification.

DETAILED DESCRIPTION OF THE INVENTION

Figure 1:
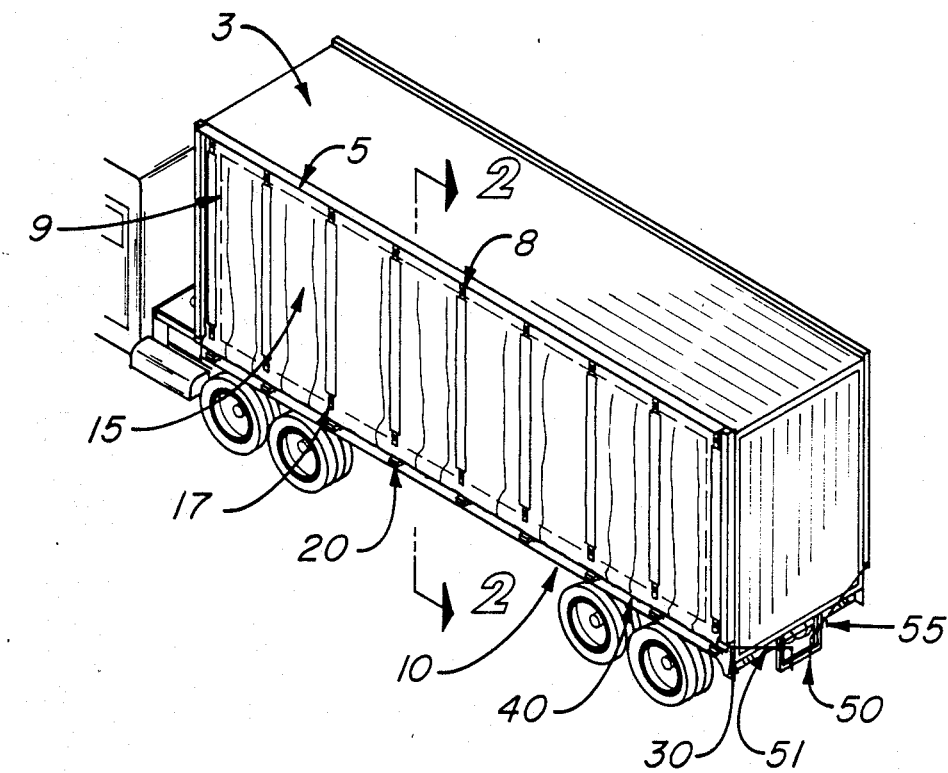
FIG. 1 is a perspective view of an open-sided trailer box showing one embodiment of the present invention.
Figure 2:
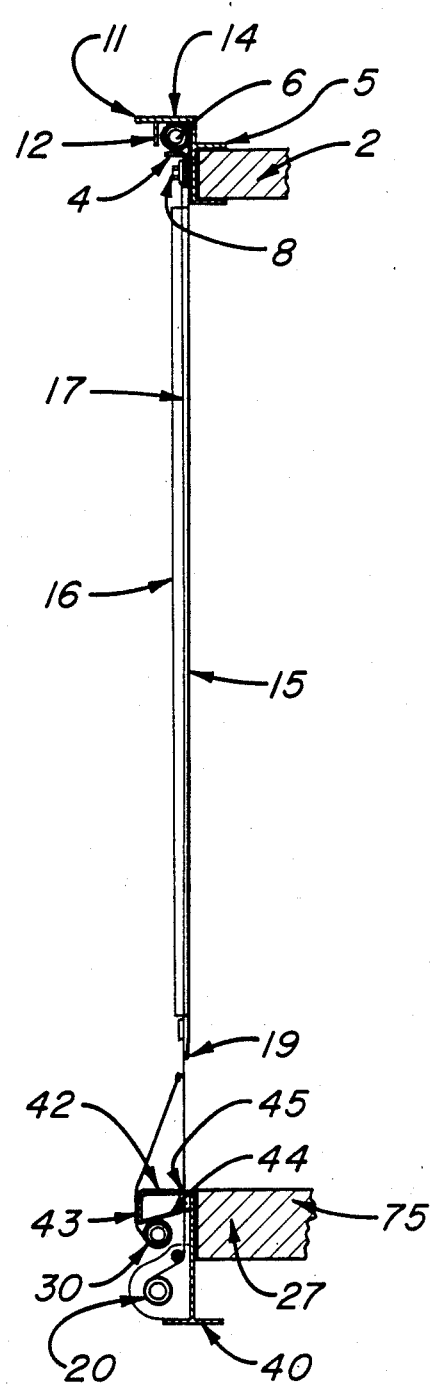
FIG. 2 is a sectional view taken along lines 2—2 of FIG. 1.
Figure 3:
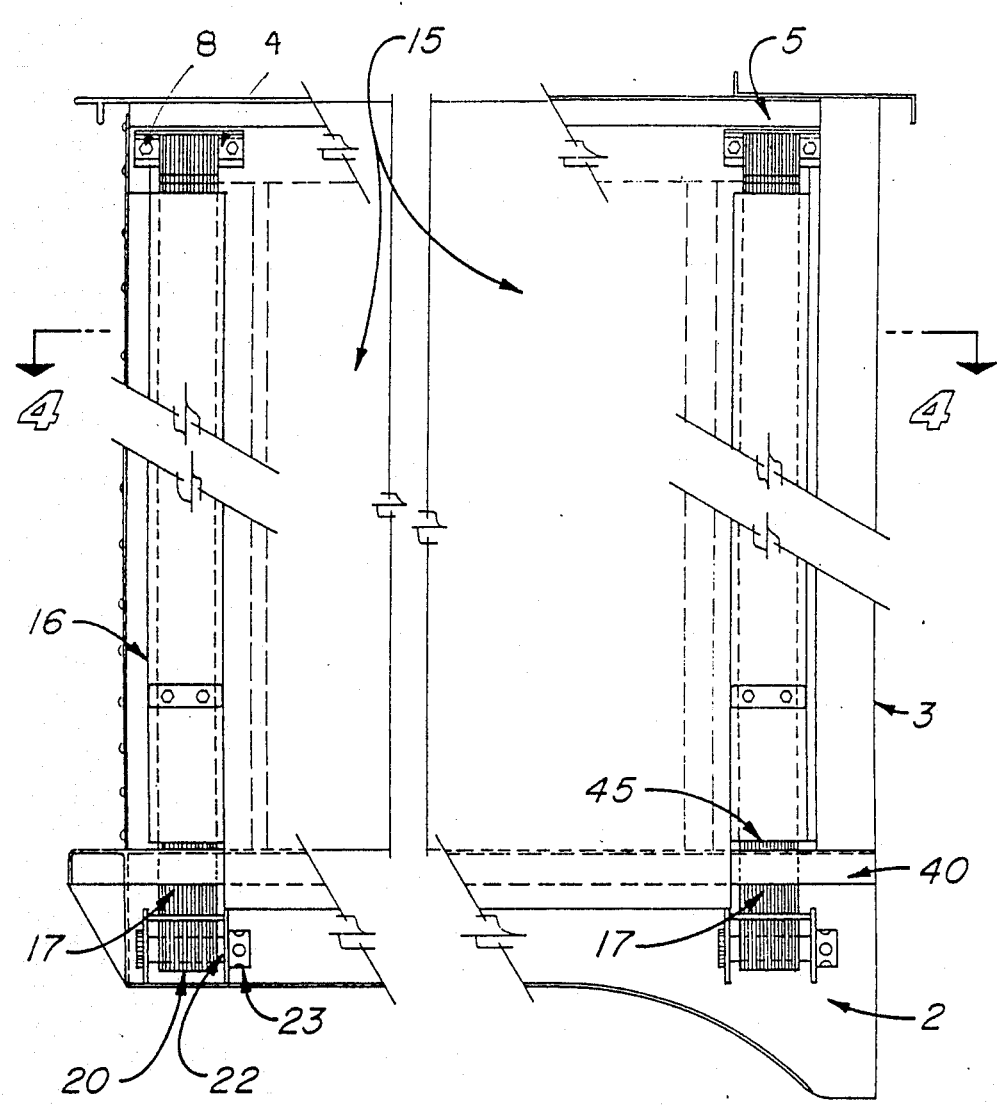
FIG. 3 is a side elevation in partial section showing the end straps and winches of the embodiment shown in FIG. 1.

Referring now to the drawings and more particularly to FIGS. 1, 2, and 3, one embodiment to be preferred of covering apparatus 10 for an open-sided trailer box 3, made according to the present invention is disclosed. Covering apparatus 10 includes a top rail 5, a flexible cover 15, vertical straps 17, winches 20, a torque tube 30, means for rotating the torque tube designated generally by the numeral 50, and a bottom rail 40.

Top rail 5, seen to advantage in FIG. 2, may be any conventional rail or clamp for affixing cover 15 to top framework 2 of trailer box 3. In the embodiment shown, the top rail includes a hanger pipe 6 extending the length of the trailer, the length of the pipe being slightly greater than the length of the side-opening 9 of the box, shown in dotted lines in FIG. 1. The hanger pipe is held in place by L-brackets 4, the top surface of each L-Bracket supporting the pipe. The L-brackets also engage cover 15 and straps 17, serving as clamps, held in place by fasteners 8 which are in the form of rivets, bolts, screws, or the like. The hanger pipe permit even distribution of the downward tension on cover 15 and straps 17, the cover forming a sleeve 14 about the hanger pipe. The top rail also preferably includes an outwardly extending cover flange 11 with a downwardly extending flange 12 which protects cover sleeve 14 from the weather and serves to hold the hanger pipe 6 in place as can readily be seen in FIG. 2.

Figure 4:
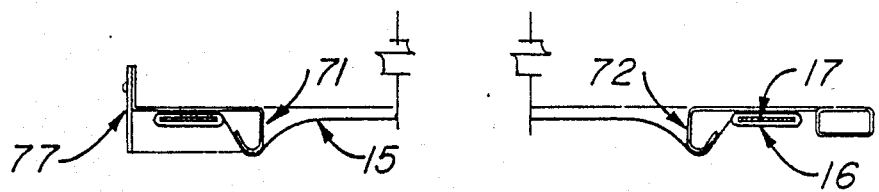
FIG. 4 is a sectional view taken along lines 4—4 of FIG. 3.

Cover 15 may be constructed of any suitable fabric such as nylon or canvas; is preferably waterproof; and dimensioned so as to cover the open side of trailer box 3, having a suitable overhang as to width and length. Referring now to FIGS. 3 and 4, it will be seen that cover 15 may be provided with a plurality of vertically extending pockets 16 formed in, sewn on, or riveted to cover 15 for retaining vertical straps 17. In this manner, tension applied to straps 17 does not directly place tension on cover 15.

Cover 15, at its lowermost edge, is attached to a torque tube or rod 30, by any suitable means. The torque tube hangs parallel with hanger pipe 6 and is provided at its rearmost end with means for rotating the tube, designated generally by the numeral 50. Rotating means 50 may include a winch with guide, as will hereinafter be explained, or may, as shown in FIG. 1, include a crank 51 connected to the torque tube as by a universal joint, not shown. A crank lock 55, which may be in the form of a hook, is attached to the rear of trailer box 3 to hold the crank at a selected position. The crank may include a telescoping handle to engage the lock for locking the torque tube and thus the cover at a selected height.

Conventional on trailer boxes are side bottom rails 40 which are formed of iron and which define the sides of the trailer floor or platform 75, as may be seen in FIG. 2. The bottom rail of the present invention preferably includes a horizontally outwardly extending flange 42 flush with the top surface of the floor, the flange being provided with a downwardly depending lip 43 from which extends inwardly inclined support 44. The bottom rail is parallel with top rail 5 and may be secured to the floor and lower frame work of trailer box 3 by any conventional means. Bottom rail 40 is provided with a plurality of horizontally spaced slots 45, vertically extending through the rail to communicate with space below the bottom rail, for reasons hereinafter explained. In closing cover 15, torque tube 30 is placed below the bottom rail, as shown, and rotated in a counter-clockwise position, as viewed in FIG. 2. The torque tube is retained under the bottom rail during the winding process by the upward force exerted against the tube by the cover.

Referring now to FIGS. 1, 2, and 3, winches 20 which engage vertical straps 17 are shown to advantage. While one winch may include a drum which engages several straps, it is preferred that a winch be provided for every strap. Winches 20 are located below bottom rail 40, and framework 22 of each winch is attached to the lowermost part of framework 2 of trailer box 3. Winches 20 are located below the bottom rail in vertical alignment with straps 17. The drum 22 of each winch is operable to engage the free end of each of the straps to place a selected tension on the particular strap. Each of the winches may be manually powered or may be driven by a motor 23, as is preferred. When carrying a non-bulk type cargo, where the load does not engage cover 15, alternate winches may be used to secure the load itself with the other winches engaging straps 17—the other straps merely being tucked into the trailer.

Vertical straps 17 are preferably composed of nylon and may be of any suitable width or thickness. The straps are affixed to the top rail and preferably are enclosed in pockets 16, as before described, so as to place no direct tension on the cover, but may be fastened directly to the cover if desired. Pockets 16 terminate at a distance of a foot or less above the bottom of the side opening, i.e., the floor of the trailer and the straps each pass through a grommet 19 in the curtain, as shown in FIG. 2. Each strap then passes through a respective slot 45 in the bottom rail, engages a roller or slide bar 27 to maintain its vertical orientation and then engages the winch. The straps adjacent the back and front edges of cover 15, as shown in FIGS. 3 and 4, place a horizontal tension on the cover as the cover partially wraps around channel members 71 and 72 respectively. The channel members prevent bulk goods from exiting the front and back edges and also prevent wind, rain, or snow from entering. Other horizontal tensioners may be provided if desired. It is also desirable that a windbreak 77 be provided the cover on the front end of the trailer.

Figure 5:
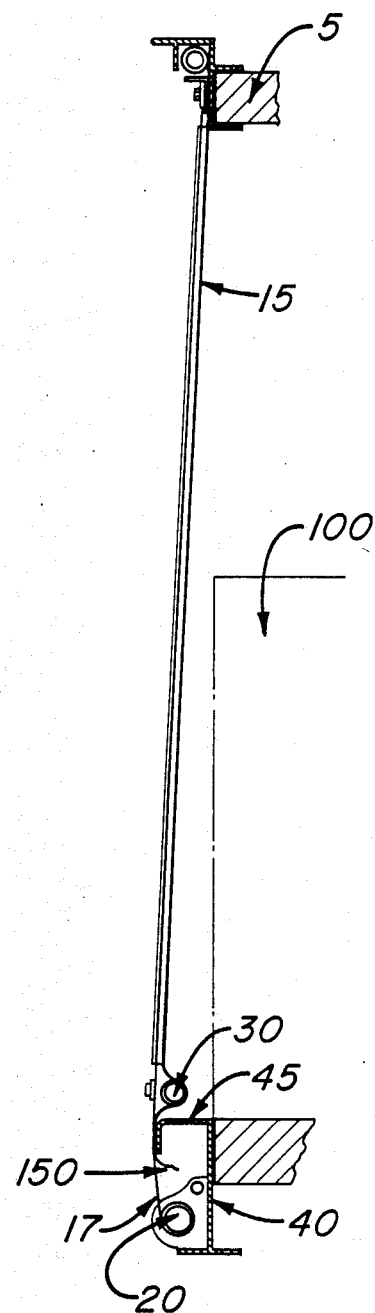
FIG. 5 is a sectional view showing a second embodiment of the present invention; the apparatus as being used for non-bulk goods.
Figure 6:
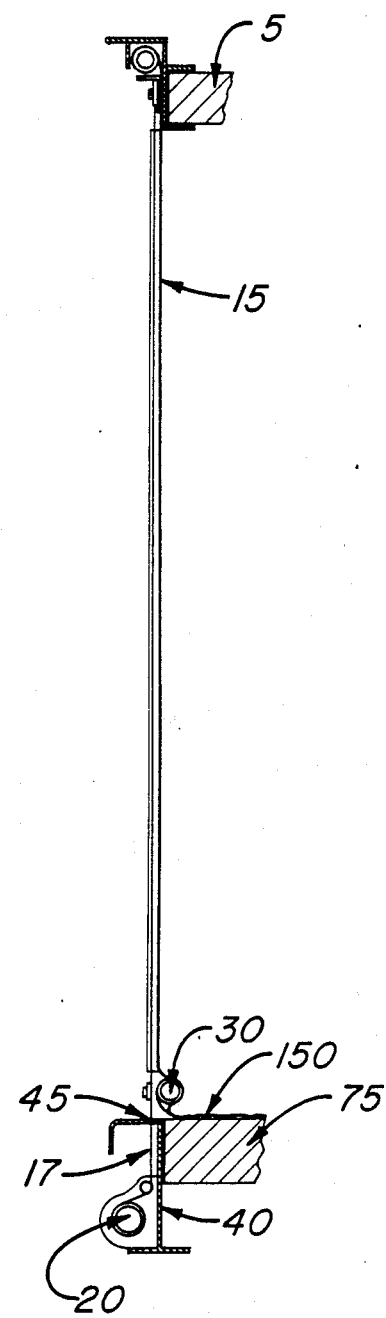
FIG. 6 is a sectional view showing a second embodiment, the apparatus as being used for bulk goods.

Referring now to FIGS. 5 and 6, a second embodiment of the present invention may be seen. The second embodiment differs from the first embodiment primarily in the location of torque tube 30 relative to curtain 15. Other components of the embodiment are the same as heretofore described. In this embodiment the torque tube is affixed to the cover at substantially the level of the top of bottom rail 40, i.e., at floor level, to define an apron designated by the numeral 150, preferably integral with the cover. When used with non-bulk cargo, as designated by the numeral 100, the apron is hung over the outside of the bottom rail. The straps 17 are also placed over the outside of the bottom rail, rather than through slots 45, to affix to winches 20 to hold the apron firmly against the bottom rail to prevent wind or moisture from entering the trailer. When used with bulk goods, the apron is laid inwardly on floor 75 and straps 17 are affixed to winches 20 through slots 45. In this manner, the weight of the bulk cargo rests on the cover apron to assist in holding the cover in place. The cover bows outwardly as shown by the dotted lines under the weight of the cargo, the straps 17 preventing excessive bulging of the cover.

Figure 7:
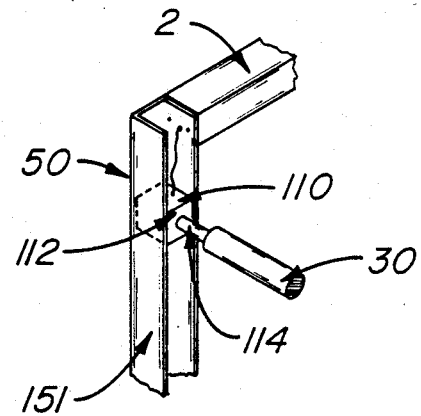
FIG. 7 is a perspective view of the torque tube winch assembly of the present invention.

Instead of utilizing a crank as means for rotating the torque tube, a torque winch and guide assembly may be provided. The assembly 50, as shown in FIG. 7, includes a guide 151, shown in the form of a channel member, and a torque winch 110 having a housing 112 vertically moveable in contact with the guide and a drum or armature 114 which engages the winch. The winch is motor driven and controlled by a switch for holding the torque tube and thus cover 15 at a selected position.

It is to be understood that the present invention may be used on trailer boxes of varying sizes and on trailer boxes which may have top openings, end openings, etc. The term "trailer box" as used herein and the appended claims is to be given a broad definition including any box used for the delivery of goods including railroad box cars as well as truck pulled trailers. For operation, and assuming cover 15 is completely rolled upon torque tube 30 and is therefore horizontally extending at the top of trailer box 3, adjacent top rail 5, crank 51 is rotated in a counter-clockwise direction, thereby lowering the cover and the torque tube upon which the cover is wound, to a position below lip 43 of bottom rail 40. Referring now to FIG. 2, it will be seen that continued rotation of crank 51 in a counter clockwise direction reverses the direction upon which cover 15 engages the torque tube and causes the torque tube to lift against support 44 or the underside of flange 42—the torque tube being held in place by the upward pull exerted by curtain 15, extending from the top rail and the engagement of the curtain, rolled upon the torque tube, against the support or underside of the flange. Once sufficiently taut, the crank is locked in place and straps 17 caused to engage winches 20 for placing desired tension on the straps. For non-bulk cargo the straps may be placed over the outside of lip 43 before attaching to the winches. For bulk cargo, the straps are placed through slots 45 of the bottom rail and then to the winches, as shown in FIG. 2. Where apron 150 is provided, the apron is laid upon the floor and covered with the bulk goods. It is to be noted that where bulk goods are being hauled, straps 17, extending through slots 45, permit some outward bulging of the cover without protruding beyond a plane defined by the outer surfaces of top and bottom rails.

Having thus described in detail a preferred selection of embodiments of the present invention it is to be ap- preciated and will be apparent to those skilled in the art that many physical changes could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

I claim:

1. Apparatus for covering an open-sided trailer box comprising:
    a top rail extending substantially the length of said box; a bottom rail extending the substantial length of said box, said bottom rail provided with one or more slots;
    a flexible cover immovably affixed to and downwardly depending from said top rail for covering the side opening;
    a plurality of laterally spaced vertical straps downwardly depending from said top rail; each of said straps receivable within a respective slot of said bottom rail;
    at least one winch affixed to said trailer box, each of said winches operable to engage one or more of said straps for placing tension thereon;
    a torque tube, horizontally extending and rotatable about a horizontal axis, affixed to said cover and said torque tube movable in a vertically upward direction for winding said cover thereon for opening the side of said trailer box and movable in a vertically downward direction for unwinding said cover therefrom for closing the side of said trailer box and;
    means for rotating said torque tube to open or close said cover.

2. The apparatus as described in claim 1 wherein said vertical straps are affixed to said cover.

3. The apparatus as described in claim 1 wherein said cover includes a plurality of vertically extending pockets, each pocket operable to receive a respective vertical strap therein.

4. The apparatus as described in claim 1 further comprising a bottom rail extending the substantial length of said trailer box parallel to said top rail.

5. The apparatus as described in claim 4 wherein said winches are affixed to said trailer box below the side opening and wherein said bottom rail is provided with one or more slots for receiving said vertical straps therethrough.

6. The apparatus as described in claim 4 wherein said bottom rail is provided with a downwardly projecting lip for containment of said torque tube thereunder.

7. The apparatus as described in claim 1 further comprising lock means for locking said torque tube at a selected position.

8. The apparatus as described in claim 1 wherein said means for rotating said torque tube includes guide means and a motor driven winch, the drum of said winch engaging said torque tube and the housing of said winch moveably engaging said guide means.

9. The apparatus as described in claim 1 wherein said torque tube is affixed to said cover adjacent the lowermost edge of said cover.

10. The apparatus as described in claim 1 wherein said torque tube is affixed to said cover above the lowermost edge of said cover to define a cover apron downwardly extending from said torque tube.

11. Apparatus for an open-sided trailer box comprising:
    a top rail, said top rail including a hanger pipe extending substantially the length of said box; a bottom rail extending the substantial length of said box, said bottom rail provided with one or more slots;
    a flexible cover immovably affixed to and vertically downwardly depending from said hanger pipe for covering the side opening;
    a plurality of laterally spaced vertical straps downwardly depending from said top rail; each of said straps receivable within a respective slot of said bottom rail;
    at least one winch affixed to said trailer box, each of said winches operable to engage one or more said straps for placing selected tension thereon;
    a torque tube rotatable about an horizontal axis affixed to said cover adjacent the lowermost edge thereof for winding the cover thereon; and
    means for rotating said torque tube for selectively winding or unwinding said cover thereon to open or close said cover.

12. The apparatus as described in claim 11 further comprising a bottom rail extending the substantial length or said trailer box parallel to said top rail for holding said torque tube thereunder.

13. The apparatus as described in claim 12 wherein said winches are affixed to said trailer box below the side opening and wherein said bottom rail is provided with one or more slots for receiving said vertical straps therethrough.

14. Apparatus for covering an open-sided trailer box comprising:
    a top rail extending the substantial length of the box; a bottom rail extending the substantial length of said box, said bottom rail provided with one or more slots;
    a flexible cover immovably affixed to and vertically downwardly depending from said top rail for covering the side opening, said cover being of a vertical length longer than the vertical length of the side opening for overlapping the bottom of the side opening;
    a plurality of laterally spaced vertical straps downwardly depending from said top rail; each of said straps receivable within a respective slot of said bottom rail;
    a least one winch affixed to said trailer box, each of said winches operable to engage one or more of said straps for the placing of selective tension thereon;
    a horizontally extending torque tube for winding said cover thereon, said torque tube affixed to said cover adjacent the bottom of side opening of the trailer box to define a cover apron downwardly extending from the torque tube; and
    means for rotating said torque tube for selective winding of said cover thereon for opening or closing said cover.

15. The apparatus as described in claim 14 wherein said means for rotating said torque tube includes a vertically oriented guide affixed to said trailer box at one end of the side opening and a motor driven winch, the drum of said winch engaging said torque tube and the housing of said winch moveably engaging said guide for vertical movement relative thereto.

16. The apparatus as described in claim 15 further comprising a bottom rail provided with one or more slots for receiving each of said straps therein and wherein said strap engaging winches are affixed to said trailer box below said bottom rail.

* * * * *